United States Patent
Rensel et al.

[11] Patent Number: 5,977,870
[45] Date of Patent: Nov. 2, 1999

[54] METHOD AND APPARATUS FOR TRANSMITTING STORED DATA AND ENGINEERING CONDITIONS OF A TIRE TO A REMOTE LOCATION

[75] Inventors: John D. Rensel, Tallmadge; Robert J. Trew, Shaker Heights, both of Ohio; Paul B. Wilson, Murfreesboro, Tenn.

[73] Assignee: Bridgestone/Firestone, Inc., Akron, Ohio

[21] Appl. No.: 08/996,137

[22] Filed: Dec. 22, 1997

[51] Int. Cl.[6] ..................................................... B60C 23/00
[52] U.S. Cl. ......................... 340/447; 340/443; 340/445; 73/146.5
[58] Field of Search .................................... 340/442, 443, 340/445, 447, 539; 73/146.3, 146.5, 146.8, 706

[56] References Cited

U.S. PATENT DOCUMENTS

| | | | |
|---|---|---|---|
| 4,067,235 | 1/1978 | Markland et al. | 73/146.5 |
| 4,137,520 | 1/1979 | Deveau | 340/447 |
| 4,160,234 | 7/1979 | Karbo et al. | 340/443 |
| 4,242,671 | 12/1980 | Plows | 367/2 |
| 4,311,985 | 1/1982 | Gee et al. | 340/447 |
| 4,319,220 | 3/1982 | Pappas et al. | 340/447 |
| 4,578,992 | 4/1986 | Galasko et al. | 73/146.5 |
| 4,609,905 | 9/1986 | Uzzo | 340/447 |
| 4,695,823 | 9/1987 | Vernon | 340/447 |
| 4,717,905 | 1/1988 | Morrison, Jr. et al. | 340/447 |
| 4,845,649 | 7/1989 | Eckardt et al. | 702/104 |
| 4,911,217 | 3/1990 | Dunn et al. | 152/152.1 |
| 5,235,850 | 8/1993 | Schurmann | 73/146.5 |
| 5,461,385 | 10/1995 | Armstrong | 340/447 |
| 5,483,827 | 1/1996 | Kulka et al. | 73/146.5 |
| 5,500,065 | 3/1996 | Koch et al. | 156/123 |
| 5,562,787 | 10/1996 | Koch et al. | 156/64 |
| 5,573,610 | 11/1996 | Koch et al. | 152/152.1 |
| 5,573,611 | 11/1996 | Koch et al. | 152/152.1 |
| 5,673,018 | 9/1997 | Lowe et al. | 340/445 |
| 5,731,754 | 3/1998 | Lee, Jr. et al. | 340/447 |

OTHER PUBLICATIONS

1983 The Institution of Electrical Engineers, Tiris: A Vehicle Tracking System Using Passive Radio Transponders.

*Primary Examiner*—Jeffery A. Hofsass
*Assistant Examiner*—Van T. Trieu
*Attorney, Agent, or Firm*—John M. Vasuta; Michael Sand; C. Santa Maria

[57] ABSTRACT

A method for monitoring various engineering conditions of a pneumatic tire such a temperature, pressure, tire rotation and other operating conditions of the tire. A tire tag is mounted on the interior of the tire within the pressurizable cavity and contains the stored data and sensors for detecting certain conditions within the cavity. A separate transponding device is mounted on the tire rim. The tire tag contains a battery, an antenna and stored data pertaining to the tire. The transponding device uses electronic circuitry which collects data from the tire tag. The tire tag is actuated by transmitted radio frequency waves from the transponding device, which data is retransmitted by the transponding device to the remote location by an antenna which extends from the transponding device through the rim to a location externally of the tire.

17 Claims, 2 Drawing Sheets

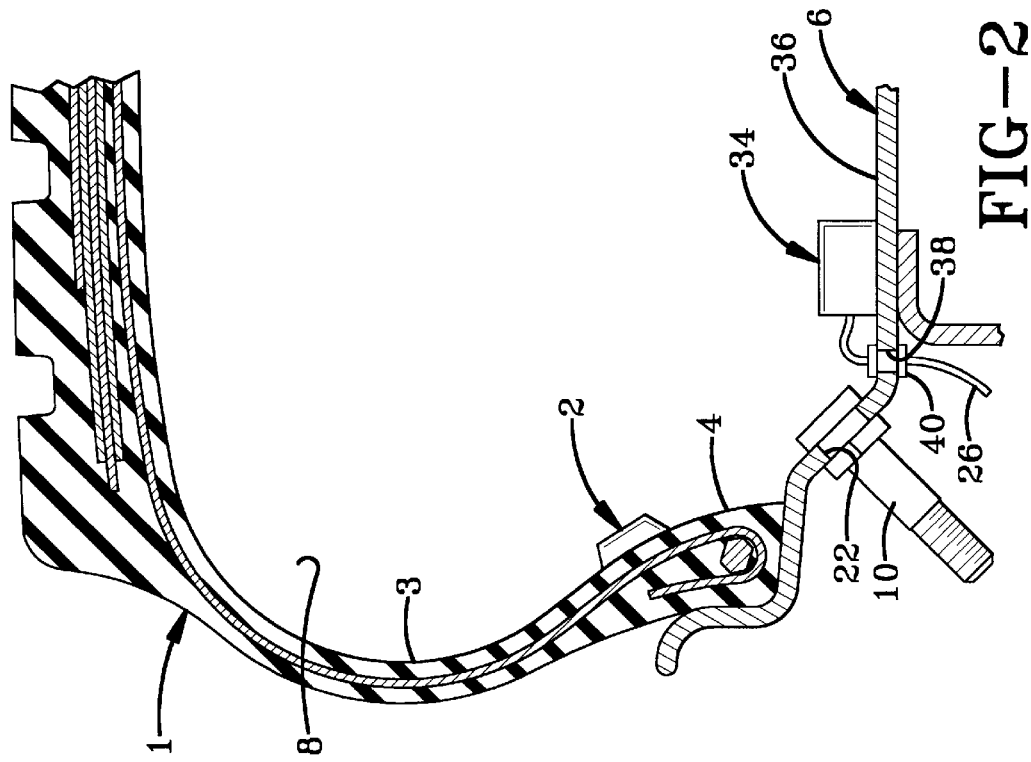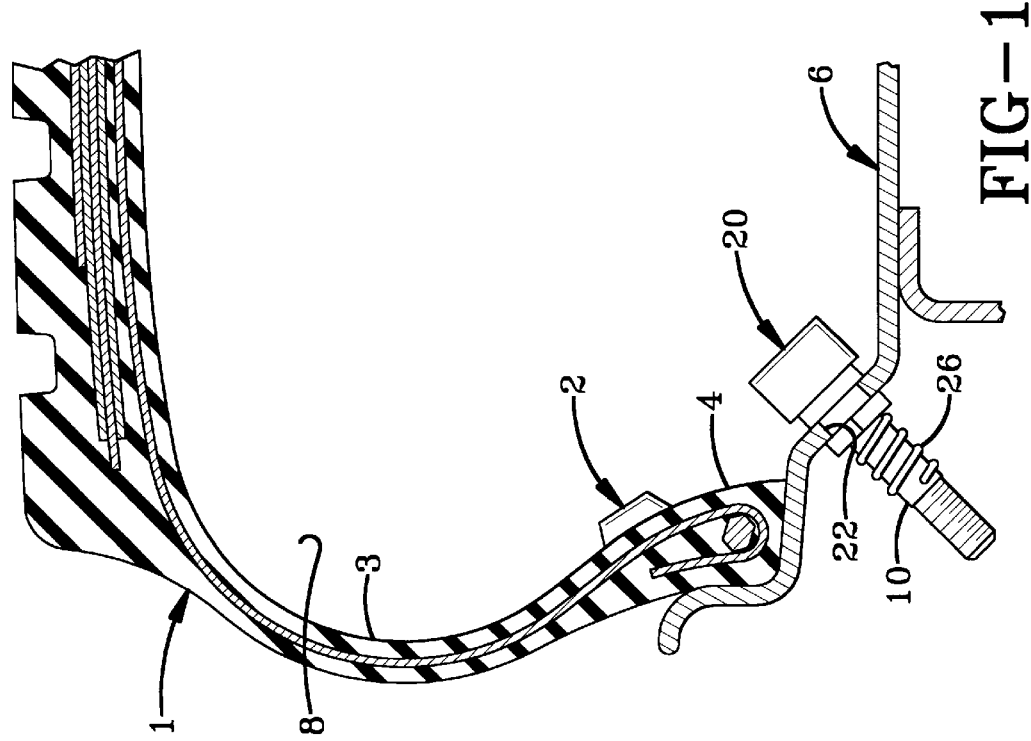

METHOD AND APPARATUS FOR TRANSMITTING STORED DATA AND ENGINEERING CONDITIONS OF A TIRE TO A REMOTE LOCATION

BACKGROUND OF THE INVENTION

Technical Field

The invention relates to a method for monitoring various physical conditions of a pneumatic tire and to a tire having a memory device containing stored information relating to the tire, and a monitoring device which senses engineering conditions within the tire. More particularly, the invention relates to a method and tire construction in which the memory and monitoring devices attach to the tire innerliner and contain electronics to maintain stored data regarding the tire, preferably an antenna and a low-powered battery to transmit and receive data to and from a transponder mounted on the tire rim. The transponder transmits the received data to a remote location via an antenna external of the tire.

Background Information

It is desirable to monitor the condition of tires as to wear, internal temperature and internal pressure. It is particularly advantageous to monitor large truck tires since these are expensive and must be regularly maintained to maximize vehicle efficiency. In the past, such monitoring activities have generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Other prior art devices used for monitoring tire conditions have comprised self-powered circuits which are positioned external of the tire, such as at the valve stem. Externally mounted devices have the disadvantage of being exposed to damage, such as from weather and vandalism. Additionally, externally installed devices can easily become disassociated from a particular tire which is being monitored.

Another disadvantage with known tire monitoring and identification devices is that communication transmissions are achieved using conventional radio frequencies which generally require a relatively large antenna which must be mounted externally or secured to the tire in such a manner which requires relatively major modifications in the tire construction or assembly process.

Many of these problems have been eliminated by the method and tire construction shown and described in U.S. Pat. Nos. 5,500,065; 5,562,787; 5,573,610 and 5,573,611. However, these devices are contained within the tire-wheel chamber and have difficulty transmitting data through the tire to external receivers. Also, some additional devices are contained within valve stems and do not attach directly to the tire so they do not provide a permanent record of the tire since a different tire could be removed and replaced with another tire on the same rim containing the device. Also, these prior devices either attach to the tire, to the wheel or to the valve stem exclusively and do not provide design flexibility which is desired in any applications. Most importantly, when using RF frequency communication, difficulties are encountered in transmitting the signals to a remote distant location due to the signals being required to pass through the tire sidewall(s), which due to its thickness in truck tires, materially reduces the transmission efficiency thereof.

Although the method and tire monitoring devices shown and described in the above four mentioned patents provide many advantages over the prior art, it is desirable to provide for a tire monitoring system which provides greater versatility and flexibility by permitting separation of module functions into discrete components capable of improvising external RF communication reception in terms of signal/noise ratio, reproducibility and distance by using two separate devices one of which is attached directly to the tire innerliner to sense temperature and pressure and the second being a transponder which is mounted on the tire rim for transmitting data from the tire/wheel to an external receiver by an antenna external of the tire.

SUMMARY OF THE INVENTION

In accordance with one aspect of the present invention, a method of monitoring tires is provided in which an activatable memory device and monitoring or sensing device, preferably combined in a tire tag, is mounted within at least one tire of a vehicle on the inner surface thereof, which tag contains stored data pertaining to the tire and sensors for sensing an engineering condition within the tire, and in which the tire tag is activated by means of a transponder mounted on the tire rim within the pressurizable cavity formed within the tire.

Another objective of the invention is to provide such a method and tire construction in which the memory and sensing devices have a relatively low-power battery and an antenna for transmitting the stored data and sensed conditions directly to the transponder mounted on the rim within the tire cavity; and in which the transponder may have a larger power source or battery than that within the tire tag for transmitting the stored data from the memory device to a remote location via an external antenna.

Another objective is to provide such a method and tire construction in which the sensing device contains sensors for sensing engineering conditions of the tire such as internal pressure and temperature, which information is also transmitted to a remote location by the transponder and external antenna.

A further objective is to provide such a method and tire construction in which the antenna of the transponder extends directly through the tire rim or through the air control valve of the tire so as to terminate externally thereof, thereby requiring less power to transmit the stored and sensed data to an external source than would be required if the antenna were located entirely within the pressurizable cavity of the tire due to the interference caused by the surrounding steel belts, tire sidewalls and tire rim.

A further objective of the invention is to provide such a method and tire construction in which the antenna of the sensing device when extending through the rim external to the pressurizable cavity, can be provided with various lengths in order to tune the antenna to match that of a particular interrogator located at a remote location.

A further objective is to provide such a method and tire construction in which the tire tag containing the memory and sensing devices can be secured to the tire wall either during manufacture of the tire or secured thereto after manufacture by utilizing a chemical or heat activatable adhesive in such a manner and location to minimize stress, strain, cyclic fatigue, impact and vibration.

A still further objective of the invention is to provide such a method, tire construction and apparatus using two separate devices, one of which is a tire tag which is attached directly to the tire innerliner to sens temperature and pressure and the second device which is a simple transponder which is attached to the tire rim to transmit collected data from the tire tag directly to an external receiver by an antenna which extends either directly through a sealed aperture in the rim or through the air control valve stem.

These objectives and advantages are obtained by the improved method of the present invention, the general nature of which may be stated as a method of transmitting stored data and an engineering condition of a pneumatic tire to a remote action wherein the tire is mounted on a rim forming an internal pressure cavity, said method comprising the steps of providing the tire with a device which provides for the storage of data pertaining to the tire and which senses an engineering condition of the tire; securing the device to the tire within said internal pressure cavity; providing a transponder which includes an amplifier, a first antenna, a first power source and a control circuit for sensing the tire data stored in the device and the engineering condition sensed by said device; securing the transponder within the pressure cavity adjacent the rim and remote from the device; locating a portion of the first antenna externally of the pressure cavity; transmitting the stored data and sensed engineering condition from the device to the transponder; and retransmitting the stored data and sensed engineering condition from the transponder to a remote location by the first antenna located externally of the pressure cavity.

These objectives and advantages are further obtained by a tire mounted on a rim and defining a pressurizable cavity between the tire and rim and having first means for storing data concerning the tire and for sensing an engineering condition within the tire, and second means for transmitting the data and sensed engineering condition to a remote location; said first means including a data storage device mounted on the tire within the pressurizable cavity and containing stored data pertaining to the tire and a sensor device mounted on the tire within the pressurizable cavity; second means including a transponder mounted adjacent to the rim and remote from the first means within the pressurizable cavity for collecting data from the data storage device and from the sensor device and for retransmitting the collected data to a remote location unattached to the tire; and said transponder further including a power source and a first antenna extending through the rim to a location external of the tire cavity for transmitting the stored data and sensed engineering condition to a remote location.

BRIEF DESCRIPTION OF THE DRAWINGS

Preferred embodiments of the invention, illustrative of the best mode in which applicants have contemplated applying the principles, are set forth in the following description and are shown in the drawings and are particularly and distinctly pointed out and set forth in the appended claims.

FIG. 1 is a fragmentary diagrammatic cross-sectional view of one-half of a pneumatic tire with the memory and sensing devices contained within a tire tag mounted on the innerliner thereof and the transponder mounted on the air control valve within the pressurizable cavity of the tire;

FIG. 2 is a fragmentary diagrammatic sectional view similar to FIG. 2 showing the transponder mounted on the rim and the antenna passing through a sealed aperture therein;

Similar numerals refer to similar parts throughout the drawings.

DESCRIPTION OF THE PREFERRED EMBODIMENTS

Figure 3:
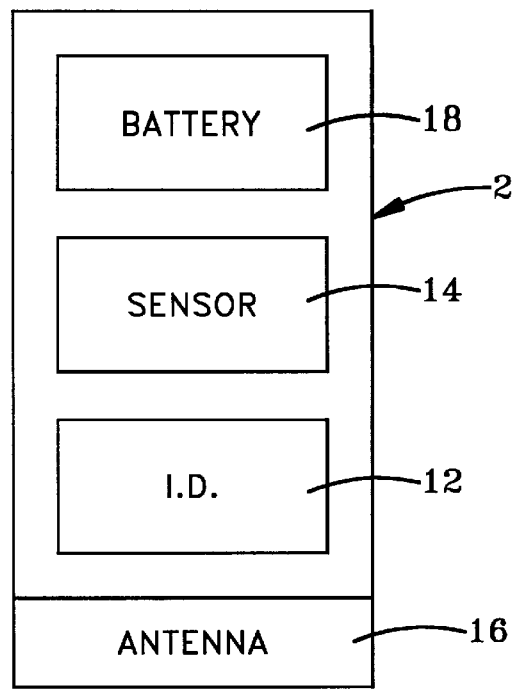
FIG. 3 is a block diagram of the components of the tire tag containing the memory and sensing devices.

Referring to FIG. 1 of the drawings, there is shown a partial sectional view of a pneumatic tire 1 having a tire tag 2 secured to the inner wall or liner 3 in a region closely adjacent the bead package 4. Tire 1 is mounted on a usual metal rim indicated generally at 6, which forms an internal pressure chamber of cavity 8 which receives a supply of air through an air control valve 10 for regulating the air pressure within the tire. The preferred location of tire tag 2, as discussed in U.S. Pat. Nos. 5,500,065; 5,562,787; 5,573,610 and 5,573,611, the contents of which are incorporated herein by reference, is a distance of about 1 to 2 inches above the toe bottom of the tire in order to reduce cyclic strain thereon.

As diagrammatically represented in FIG. 3, tire tag 2 includes a memory device 12, a monitoring or sensing device 14, and preferably includes an antenna 16 and a battery 18. Memory device 12 preferably contains stored data, such as identification information pertaining to the particular tire on which tag 2 is mounted. Sensing device 14 preferably includes sensors which senses an engineering condition of the tire such as the internal temperature and/or pressure.

Tag 2 may be assembled with the tire during its manufacture or secured thereto by a solvent or heat activatable adhesive such as described in the four above identified patents.

Figure 4:
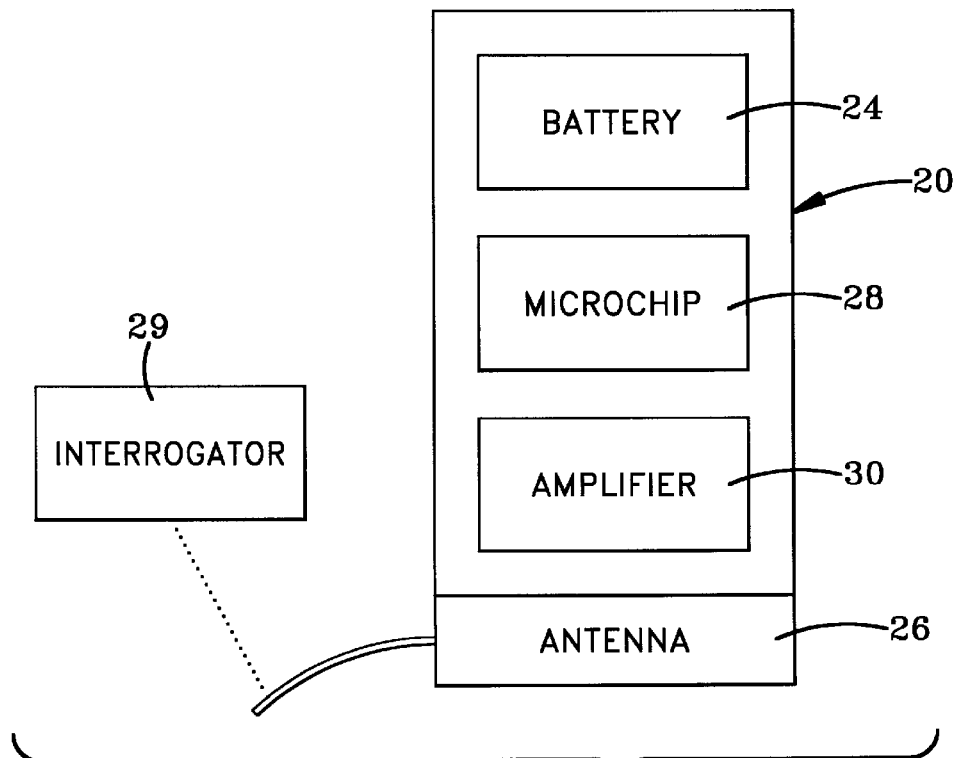
FIG. 4 is a block diagram of the components of the transponder.

In accordance with one of the main feature of the invention, transponder 20 is mounted on or incorporated within air control valve 10 which extends through a usual opening 22 formed in rim 6. Transponder 20 preferably is encased within an encapsulating material so as to be less affected by the ambient temperature, pressures and other harsh environment to which it may be exposed. As shown in FIG. 4, transponder 20 preferably includes a battery 24, an antenna 26, a microchip 28 containing the appropriate electronic control circuitry which is connected with and operates an amplifier 30 to drive antenna 26 with said information, which information is then transmitted by antenna 26 to a remote interrogating unit 29. If desired, transponder 20 may have more than one antenna for transmitting and receiving at the same time with more than one frequency. This interrogating unit can be located in the cab of a truck or could be remotely located at a completely external location either mobile or fixed, which is operable when the tire or vehicle is in the vicinity of the interrogating unit. The details of microchip 28, amplifier 30 and tire tag 2 preferably are the type which are described in detail in the four patents referenced above, and thus are not described in further detail.

FIG. 2 shows a modified transponder 34 which is mounted directly on inside surface 36 of rim 6 instead of on valve 10.

Antenna 26 extends through a sealing grommet 40 which is seated in an aperture 38 formed in rim 6 so as to extend externally of the tire to provide for the desired increased efficiency in the transmission of the collected data and an increase in the signal/noise ratio and enhanced reproducibility of the signal, and enabling greater transmission distances to be achieved between the vehicle tire and a remote interrogator since there is no appreciable loss of signal strength which heretofore resulted when the signal had to be transmitted from within the tire through the tire sidewall.

In accordance with another of the main features of the invention, the improved apparatus and tire construction exploits the wireless communications capability of transponders to receive and transmit data within the tire to a fixed storage device that retains the tire ID and service history (temperatures, pressures, etc.) and to receive and transmit same or similar data to an external source via radio frequency (RF) communications. This is in contrast to prior art tire tags which attach to the tire, to the wheel or to the valve stem exclusively and which have the entire components incorporated therein. Thus, the improved apparatus of the invention adds design flexibility to the tire tag module and permits separation of module functions into discrete components improvising external RF communication reception in terms of signal/noise ratio, reproducibility and distance since the signals do not have to be transmitted through the tire to the external receivers or interrogators. Likewise, the transponder can be mounted directly on the rim or on the air control valve without affecting the concept of the invention with the antenna in both cases extending through the rim to an external location of the tire.

The improved apparatus is comprised of at least two electronic components one of which is similar in many respects to the tire tags defined in the above forementioned patents which attaches to the innerliner. This may use a patch and contain electronics to sense temperature and pressure; and provide ID storage of data in memory. This device will transmit/receive data to/from a second device namely, transponder 20 which is located within the tire-wheel envelope or cavity. This transponder is a relatively simple and inexpensive device and therefore, in addition to providing enhanced communication, does so at a reduced cost. Likewise, the mounting of the transducer directly on the rim or the air control valve renders it unaffected by the high temperatures which the tire incurs during its initial manufacture and vulcanization and subsequent retreading, which is common in larger truck size tires. Also, the particular microchip and sensor thereof need not be dedicated to a particular tire but can be changed to achieve various results without specific regards to the particular tire on which it will be mounted.

Also, battery 24 can be considerably larger and have greater power output than battery 18 of tire tag 2. This simplifies tag 2 and reduces its cost and size over the tire tag devices of prior art monitoring systems. Also, battery 24 can be larger and more powerful since it will not affect the ride provided by the tire since it is mounted on the tire rim and not located on one side of the tire innerliner as in prior devices. Also, the battery is unaffected by the heat of vulcanization and can be replaced easier than if formed as an integral component of the tire tag which may be formed as an integral part of the tire.

An important advantage of the monitoring system of the present invention is the placement of antenna 26 exteriorly of cavity 8 by feeding it through grommet 40 or other type of sealed opening in the tire, or by incorporating it in or on the inflation stem 10 as shown in FIG. 1. This enables battery 24 to consume less power to transmit the information to a remote interrogator since it is not surrounded by the usual steel belts and sidewalls of a tire as in prior art systems wherein the antenna is located entirely within the tire cavity. Furthermore, the antenna can be "tuned" by varying the length thereof since it is readily accessible exteriorly of the tire.

It is also readily apparent that the memory and sensing devices in tag 2 could be activated directly by an outside interrogator and function without its own internal battery, although the use of a low-power battery and antenna contained within the tire tag is preferable since the same can be achieved relatively inexpensive and will provide increased versatility thereto. Another advantage is that memory device 12, due to its low cost of production and installation, will have a particular memory pertaining to the tire in which it is affixed and need not be erased and reprogrammed when put on a different rim and will remain on the tire throughout its life. Again, the chief advantage is that the monitoring system of the present invention is more versatile in that it adds design flexibility to the tire tag and permits separation of module functions into discrete components capable of improving external RF communication reception in the term of signal/noise ratio, reproducibility and distance.

Accordingly, the improved method and apparatus for transmitting stored data and engineering conditions of a tire to a remote location is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus for transmitting stored data and engineering conditions of a tire to a remote location is construed and used, the characteristics of the construction, and the advantageous, new and useful results obtained, the new and useful structures, devices, elements, arrangements, parts and combinations and method steps, are set forth in the appended claims.

We claim:

1. A method of transmitting stored data and an engineering condition of a pneumatic tire to a remote location wherein the tire is mounted on a rim forming an internal pressure cavity, said method comprising the steps of:

providing the tire with a device which provides for storage of data pertaining to the tire and which senses an engineering condition of the tire and which includes a first antenna;

securing the device permanently to the tire within said internal pressure cavity;

providing a transponder which includes an amplifier, a second antenna, a first power source and a control circuit for sensing the tire data stored in the device and the engineering conditions sensed by said device;

securing the transponder within the pressure cavity on the rim and remote from the device, said first power source being removably mounted with respect to the rim;

locating a portion of the second antenna externally of the pressure cavity;

transmitting the stored data and sensed engineering condition from the device the transponder by using radio frequency (RF) and the first antenna; and retransmitting the stored data and sensed engineering condition from the transponder to a remote location by using radio frequency (RF), the first power source and the second antenna independent of an operating condition of the tire and independent of external stimulus.

2. The method defined in claim 1 including the step of securing the data storage and sensing device to an innerliner of the tire.

3. The method defined in claim 2 including the step of bonding the data storage and sensing device to the innerliner of the tire within the pressure cavity after finished molding of said tire.

4. The method defined in claim 1 including the step of securing the transponder to the rim within the pressure cavity of the tire.

5. The method defined in claim 1 including the step of extending the second antenna externally of the pressure cavity by passing said second antenna through a sealed opening of the rim.

6. The method defined in claim 1 including the step of mounting the transponder on an air control valve of the tire.

7. The method defined in claim 6 including the step of extending the first antenna externally of the pressure cavity by passing said antenna through the air control valve.

8. The method defined in claim 1 including the step of providing the data storage and sensing device with a second power source.

9. A tire mounted on a rim and defining a pressurizable cavity between the tire and rim and having first means for storing data concerning the tire and for sensing an engineering condition within the tire, and second means for transmitting the data and sensed engineering condition to a remote location;

said first means including a data storage device containing stored data pertaining to the tire, a sensor device, and a first antenna, said first means being permanently mounted on the tire within the pressurizable cavity; and second means including a transponder mounted on the rim and remote from the first means within the pressurizable cavity for collecting data from the data storage device and from the sensor device and for retransmitting the collected data by radio frequency (RF) to a remote location unattached to the tire;

said transponder further including a removably mounted power source and a second antenna extending through the rim to a location external of the tire cavity for transmitting the stored data and sensed engineering condition to the remote location independent of an operating condition of the tire and independent of external stimulus.

10. The tire as defined in claim 9 wherein the data storage device and sensor device are encapsulated by a material and secured to an innerliner of the tire in the vicinity of a tire bead.

11. The tire as defined in claim 9 wherein the rim includes an air control valve, and in which the second antenna extends through said valve.

12. The tire as defined in claim 9 wherein the data storage and sensing means includes a battery and RF circuit means for transmitting the sensed engineering condition and stored data to the transponder.

13. The tire as defined in claim 9 wherein the power source is a battery.

14. Apparatus in combination with a pneumatic tire for monitoring said pneumatic tire comprising:

a tire tag permanently mounted on the tire within a pressure chamber of the tire containing a sensor for sensing an engineering condition within the tire; and a separated transponding device mounted on a rim of the tire, said transponding device including a first antenna, an amplifier, a replaceable first power source for monitoring and transmitting the sensed engineering condition from the tire tag to an independent remote location by the first antenna and first power source independent of an operating condition of the tire and independent of external stimulus.

15. The apparatus and tire combination as defined in claim 14 wherein the tire tag includes an outer housing of a material suitable for securing the tire tag to an interior of the tire.

16. The apparatus and tire combination as defined in claim 14 wherein the tire tag includes a second power source and a second antenna.

17. The apparatus and tire combination as defined in claim 14 wherein the tire tag and transponding device each includes radio frequency (RF) circuit means for transmitting the data and sensed engineering condition.

* * * * *